United States Patent [19]

Scott

[11] Patent Number: 5,396,486

[45] Date of Patent: Mar. 7, 1995

[54] DATA COMMUNICATIONS EQUIPMENT INTERFACE LEADS TO SIGNAL HALF-DUPLEX OR FULL-DUPLEX OPERATION

[75] Inventor: Robert E. Scott, Indian Rocks Beach, Fla.

[73] Assignee: AT&T Corp., Murray Hill, N.J.

[21] Appl. No.: 992,183

[22] Filed: Dec. 17, 1992

[51] Int. Cl.6 .......................... H04L 5/14; H04L 5/16
[52] U.S. Cl. ......................................................... 370/31
[58] Field of Search ........................ 370/31, 24, 26, 32, 370/32.1; 375/7, 8, 29, 30; 379/97, 98, 99

[56] References Cited

U.S. PATENT DOCUMENTS

| | | | |
|---|---|---|---|
| 4,599,719 | 7/1986 | Breen et al. | 370/31 |
| 4,653,044 | 3/1987 | Kudo | 370/31 |
| 4,771,417 | 9/1988 | Maxwell et al. | 379/98 |
| 4,893,305 | 1/1990 | Fernandez et al. | 370/31 |
| 4,897,831 | 1/1990 | Negi et al. | 370/31 |

Primary Examiner—Douglas W. Olms
Assistant Examiner—Dang Ton
Attorney, Agent, or Firm—Joseph J. Opalach

[57] ABSTRACT

The Electronic Industry Association (EIA) RS-232 interface signals are manipulated to additionally convey operating mode information from a piece of data communications equipment (DCE) to its respective data terminal equipment (DTE). In particular, in establishing a data connection, the data communications equipment may transmit information in either half-duplex mode or full-duplex mode. In order to convey which mode of transmission is being used, the data communications equipment manipulates the EIA RS-232 interface signals to provide a notification signal, which is representative of the particular mode, to the data terminal equipment. As a result of receiving this notification signal, the data terminal equipment can then switch to the same mode of operation.

11 Claims, 2 Drawing Sheets

DATA COMMUNICATIONS EQUIPMENT INTERFACE LEADS TO SIGNAL HALF-DUPLEX OR FULL-DUPLEX OPERATION

BACKGROUND OF THE INVENTION

The present invention relates to data communications equipment and data terminal equipment In particular, this invention relates to the use of the interface between the data communications equipment and the dam terminal equipment.

Currently, there are a number of communications networks that are built around the 208B type of data communications equipment, or modem, which transfers data via a half-duplex signaling scheme at a transmission speed of 4800 bits per second (sec.). One example of such a communications network is the Electronic Data Interchange (EDI) network, which may be used by a business to distribute billing and inventory to its various locations, In addition, some states provide a half-duplex communications network to allow insurance carders to gain access to a state's division of motor vehicles data base to get information on licensed drivers within a state.

However, the 208B type of modem has been around for a long time and in comparison to a state-of-the-art modem, like the V.32 modem, it has a lower data throughput For example, the V.32 modem can transfer data via a full-duplex signaling scheme and has a transmission speed of 9600 bits per second. Unfortunately, a V.32 type of modem will not connect to a 208B modem. As a result, customer's who have networks comprising 208B modems can only upgrade to a V.32 type of modem by changing out their entire network of modems—at a large cost.

There have been some attempts in the prior art to deal with communications networks comprising different types of modems. One manufacturer sells a modem that can provide either a 208B mode of operation or a V.32 mode of operation. However, the particular mode of operation of this modem is determined by the adjustment of a hardware strap. In other words, the customer must physically access the modem and change a switch setting on the modem. Consequently, this requires that the mode of operation must be determined before even attempting to establish a connection to another modem. Therefore, the customer must know ahead of time the identity of the other modem, i.e., whether it is a 208B type of modem or a V.32 type of modem. While this may be feasible for originating a data call to another modem, this may not be a practical for answering a data call from another modem.

The co-pending commonly assigned United States application of R. E. Scott entitled "Half-Duplex or Full-Duplex Automode Operation for use in Data Communications Equipment," Ser. No. 07/978,536, filed on Nov. 17, 1992, now U.S. Pat. No. 5,349,635 which is hereby incorporated by reference, discloses a technique for overcoming the requirement of having to manually set the data communications equipment to either a half-duplex mode or a full-duplex mode of operation. Specifically, the Scott patent application teaches the notion of automatically switching between either a 208B, i.e., half-duplex, mode or a V.32 , i.e., full-duplex, mode of operation within the data communications equipment.

Unfortunately, even if the data communications equipment automatically switches between a full-duplex mode or a half-duplex mode of operation, its respective data terminal equipment cannot automatically switch between these modes. In other words, irrespective of the data communications equipment mode of operation, the data terminal equipment must be manually configured to either a half-duplex mode or a full-duplex mode of operation. For example, if both the data communications equipment and the data terminal equipment are set for half-duplex operation and then the data communications equipment automatically switches to full-duplex operation, the data terminal equipment is still left operating in a half-duplex mode. In other words, the data terminal equipment is no longer synchronized to the operating mode of the data communications equipment. Consequently, the respective user of the data terminal equipment is not receiving the full benefit of full-duplex operation, which can provide two times the data throughput of half-duplex operation.

SUMMARY OF THE INVENTION

As noted above, if a data communications equipment is capable of automatically selecting a number of different modes of operation, there is no ability to synchronize its respective data terminal equipment to the selected operating mode. Therefore, and in accordance with the principles of the invention, a notification technique is used by the data communications equipment to signal the data terminal equipment as to the selected mode of operation. This allows the respective data terminal equipment to then switch to the data communications equipment selected mode of operation.

In an embodiment of the invention, a modem manipulates the Electronic Industry Association (ETA) RS-232 signals to additionally convey operating mode information from the modem to its respective data terminal equipment. In particular, in establishing a data connection, the modem automatically selects either a half-duplex mode of operation or a full-duplex mode of operation. The modem then manipulates signals data-set-ready and clear-to-send of the EIA RS-232 interchange in such a manner as to convey whether the half-duplex mode or the full-duplex mode of operation was selected. As a result of receiving this signal, the data terminal equipment can then switch to the same mode of operation.

DETAILED DESCRIPTION

Figure 1:
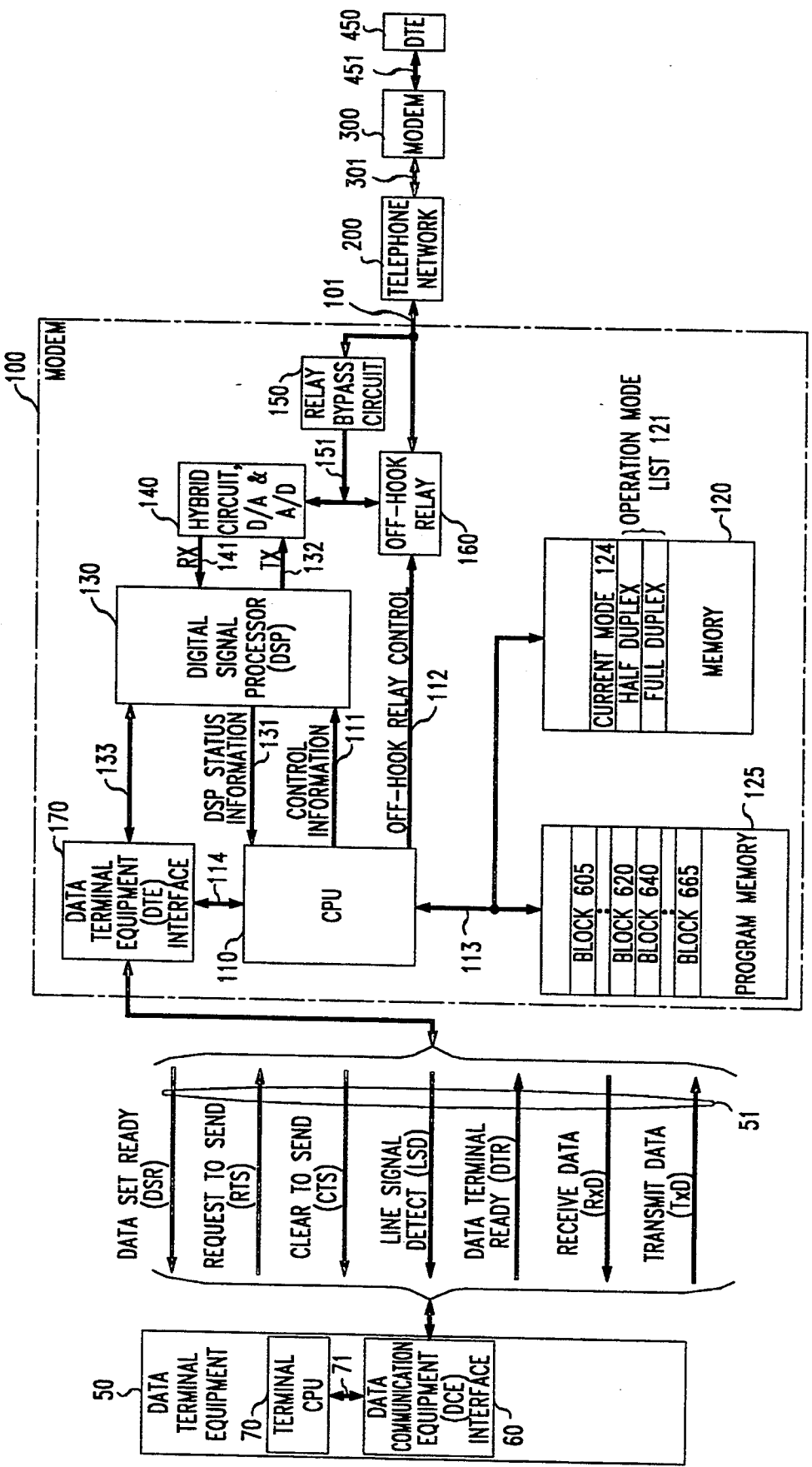
FIG. 1 is a block diagram of a modem embodying the principles of the invention.

FIG. 1 shows a modem that embodies the inventive concept, the individual components of which are well-known and are not described in detail. As shown, modem 100 is connected to telephone network 200, via telephone line 101. Similarly, modem 300 is connected to telephone network 200 via telephone line 301. The PSTN, or communications channel, is represented by telephone lines 101 and 301, and telephone network 200. Telephone lines 101 and 301 are representative of typical "tip/ring," or local loop, access provided by telephone network 200. Either modem 100 or modem 300 can place a telephone call to another modem by going "off-hook" and following standard dialing procedures.

Modem 100 comprises CPU 110, memory 120, program memory 125, digital signal processor (DSP) 130, hybrid circuit 140, relay bypass circuit 150, off-hook relay 160, and dam terminal equipment interface 170. CPU 110 is a microprocessor-based central processing unit which operates on, or executes, program data stored in program memory 125, via path 113, as represented by blocks 605 to 665 (discussed below). Program memory 125 is a read only memory (ROM) while memory 120 is a random access memory (RAM). The latter comprises a number of representative storage locations, of which a subset is shown in FIG. 1. It is assumed that memory 120 stores at least the following data: operating mode list 121, which includes data that is representative of a number of operating modes; and current mode 124, which stores the current operating mode of modem 100. In addition, for simplicity, it is assumed that hybrid 140 is not only a 2-to-4 wire converter but also includes other well-known processing circuitry like analog-to-digital converters and digital-to-analog converters for processing an incoming or outgoing signal, respectively.

Both modems 100 and 300 are connected to data terminal equipment DTE 50 and DTE 450 via interfaces 51 and 451, respectively. Both of these interfaces represent a collection of signals as specified in Electronic Industry Association (EIA) standard RS-232, which is a standard for interconnecting data terminal equipment to data communications equipment, e.g., DTE 50 to modem 100. A subset of these signals is shown within interface 51. In addition, as is shown in FIG. 1, DTE 50 comprises terminal CPU 70 and data communications interface 60.

In the following example, it is assumed that modem 300 is the originating modem and places a telephone call to modem 100 through telephone network 200. For the purposes of this example, it is assumed that modem 100 operates in accordance with teachings of the above-mentioned co-pending Scott patent application and that there are two operating modes: a half-duplex mode and a full-duplex mode.

Modem 100 receives a "ringing signal," on telephone line 101, from telephone network 200. This ringing signal represents the incoming telephone call from modem 300. Both off-hook relay 160 and relay bypass circuit 150 receive this ringing signal. Initially, off-hook relay 160, under the control of CPU 110 via off-hook relay control lead 112, blocks this incoming signal from hybrid circuit 140. In actuality, off-hook relay 160 controls the line impedance that is seen by telephone network 200. This line impedance, as is known in the art, provides an indication to telephone network 200 as to whether or not the called party, in this case modem 100, has answered the telephone call. In other words, initially modem 100 is in the "on-hook" state, that is, modem 100 has not yet answered the telephone call—with the result that telephone network 200 continues to apply the ringing signal on telephone line 101. Notwithstanding the fact that off-hook relay 160 blocks this ringing signal to hybrid 140, relay bypass circuit 150 provides the tinging signal to hybrid 140 via lead 151. Hybrid 140 provides the ringing signal on received signal lead 141 to DSP 130, which detects the ringing signal and provides to CPU 110, via DSP status information path 131, information that represents a ringing signal is being received.

Figure 2:
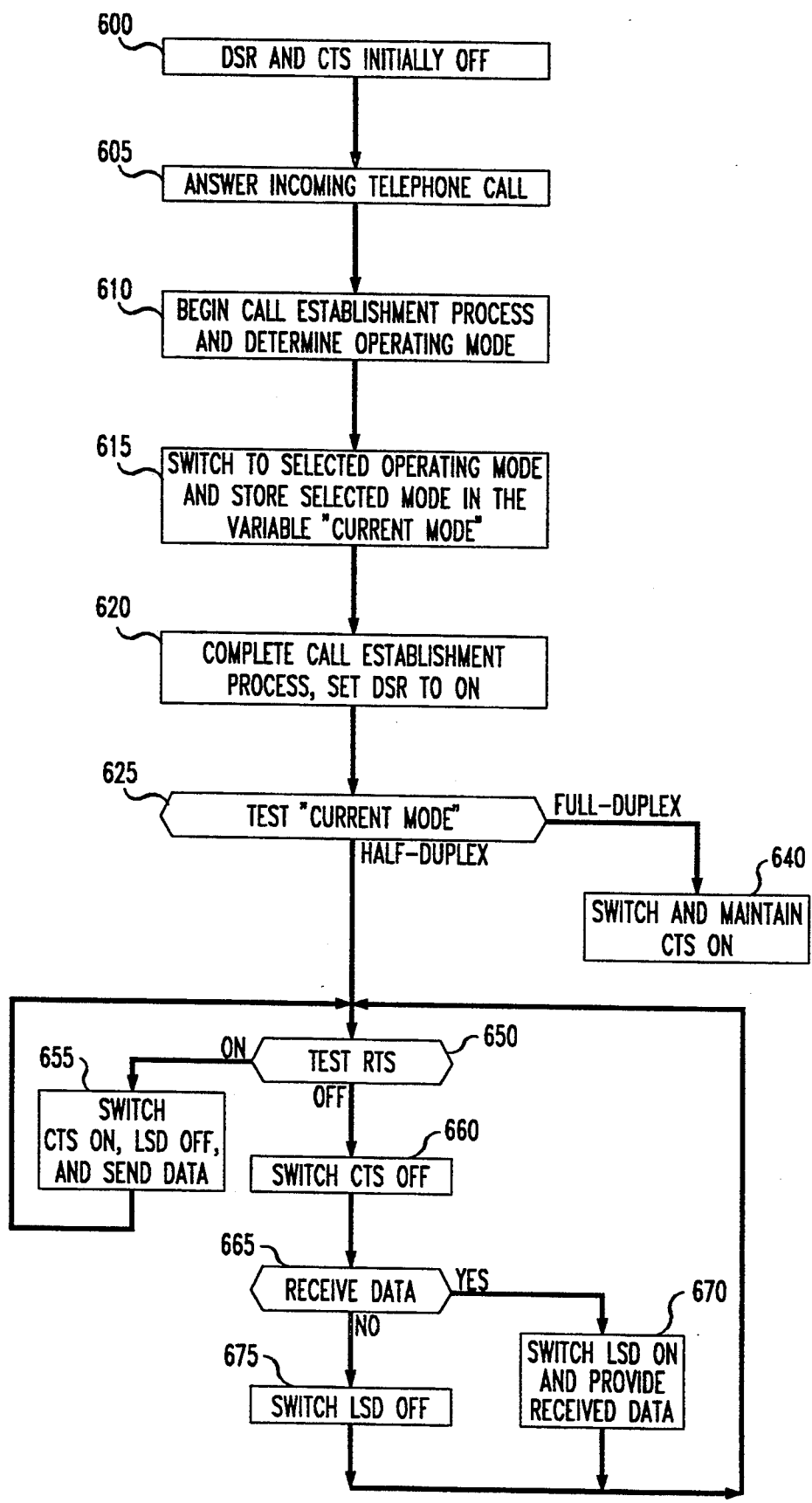
FIG. 2 is a flow diagram of a method embodying the principles of the invention used in the modem of FIG. 1.

A representative method for processing the incoming telephone call in modem 100 in accordance with the principles of the invention is shown in FIG. 2. In the following, it is assumed that the states of an EIA signal—OFF and ON—conform to the respective voltage levels defined in the above-mentioned standard, EIA RS-232. Initially, CPU 110 sets EIA RS-232 signals data-set-ready (DSR) and clear-to-send (CTS), of interface 51, "OFF" in step 600 of FIG. 2. Then in step 605, CPU 110 answers the incoming telephone call by activating off-hook relay 160, via off-hook relay control lead 112, thereby signaling an "off-hook" condition to telephone network 200 that modem 100 has answered the telephone call. In addition, in step 610, CPU 110 sends information to DSP 130, via control information path 111, to begin the data call establishment process, e.g., to initiate the call establishment sequence disclosed in the co-pending Scott application. In particular, during this call establishment process, CPU 110 determines if the remote modem, i.e., modem 300, supports a half-duplex mode of operation or a full-duplex mode of operation. Once CPU 110 determines which operating mode modem 300 supports, CPU 110 automatically switches to that operating mode in step 615 and stores data representative of the selected operating mode in the variable represented by memory location current mode 124. At this point, CPU 110 completes the call establishment process that includes modem handshaking and training to establish the data connection with modem 300 with the appropriate modulation in step 620. With the establishment of the data connection to modem 300, controller 110 switches signal DSR of interface 51 to the ON state via a signal on path 114.

After the selection of the operating mode, and in accordance with the invention, the EIA RS-232 signal leads are used by the DCE equipment, i.e., modem 100, to notify the DTE equipment whether or not modem 100 is using a half-duplex mode or a full-duplex mode of operation. This allows a DTE to automatically switch from a half-duplex mode to a full-duplex mode, or vice versa, and thereby maintain synchronization with its DCE. After establishing the data connection, CPU 110, in step 625, branches to two different sequences of processing steps depending on the value of the data stored in the memory location represented by current mode 124.

If the value of current mode 124 represents a half-duplex mode of operation, then in step 650 CPU 110 tests the request-to-send (RTS) signal of interface 51 that is provided by DTE 50 whenever DTE 50 wants to provide data to modem 100. If RTS is ON, then, in step 655, CPU 110 switches CTS ON and line-signal-detect (LSD) OFF, and accepts data from DTE 50, via the transmit-data (TxD) lead of interface 51, for transmission to modem 300. At this point, CPU 110 goes back to step 650 to continue to test the RTS signal of interface 51. When RTS is OFF, then, in step 660, CPU 110 switches CTS OFF and determines if there is data to provide DTE 50 in step 665, i.e., data received from modem 300. If there is data to provide to DTE 50 via the receive data (RxD) lead of interface 51, then CPU 110 switches the LSD signal of interface 51 ON and provides the data to DTE 50 in step 670. However, if there is no data to provide to DTE 50, then CPU 110 switches LSD OFF in step 675 and returns to step 650 to continue to test the RTS signal from DTE 50. As a result from the above, it can be observed that when modem 100 is in half-duplex mode, it manipulates the CTS signal to follow the RTS signal of DTE 50. Consequently, terminal CPU 70 of DTE 50 detects the half-duplex mode of modem 100 via data communications interface 60, which provides the signals from interface 51.

On the other hand, if modem 100 supports a full-duplex mode of operation, then in step 640, modem 100 switches and maintains CTS ON irrespective of the RTS signal from DTE 50. As a result, terminal CPU 70 of DTE 50 detects that modem 100 is in a full-duplex operating mode because CTS is ON, yet RTS is OFF as provided by data communications interface 60. This allows DTE 50 to take advantage of the possible increases in data throughput from a full-duplex data connection by similarly switching to a full-duplex mode of operation.

From the above description, it can be seen that the method of FIG. 2 similarly applies when modem 100 is originating a data call to modem 300 except for the substitution in step 605 for an origination sequence with a corresponding change in call establishment process performed in step 610.

The foregoing merely illustrates the principles of the invention and it will thus be appreciated that those skilled in the art will be able to devise numerous alternative arrangements which, although not explicitly described herein, embody the principles of the invention and are within its spirit and scope. For example, rather than notifying the data terminal equipment via a standard interchange circuit, the data communications equipment can be coupled directly to an internal data bus of its respective data terminal equipment.

I claim:

1. A method for use in data communications equipment comprising the steps of:
   establishing a data connection from the data communications equipment to a remote data communications equipment;
   selecting in the data communications equipment either a half-duplex mode or a full duplex mode for communicating information to, and receiving information from, the remote data communications equipment; and
   providing a notification from the data communications equipment to the data terminal equipment, which is coupled to the data communications equipment, of the selected mode.

2. The method of claim 1 wherein the notifying step includes the steps of:
   providing a signal representative of data-set-ready to the data terminal equipment, where the data-set-ready signal is in the ON state, which is representative that said data connection has been established; and
   providing a clear-to-send signal to the data terminal equipment that differs as a function of the selected mode.

3. The method of claim 2 wherein the step of providing the clear-to-send signal a) manipulates the clear-to-send signal to follow a signal representative of request to send that is provided by the data terminal equipment to the data communications equipment when said selected mode is half-duplex, and b) maintains the clear-to-send signal in the ON state irrespective of the request to send signal when said selected mode is full-duplex.

4. A method for use in transmitting information between two endpoints, where one of the two endpoints comprises data communications equipment that is coupled to data terminal equipment, the method comprising the steps of:
   defining in the data communications equipment a half-duplex mode of operation and a full-duplex mode of operation, each operating mode affecting the communication of information to the other endpoint;
   establishing a data connection from the data communications equipment to the other endpoint;
   switching in the data communications equipment to one of the operating modes;
   providing a notification to the data terminal equipment of the one of the operating modes;
   receiving said notification in the data terminal equipment of the one of the operating modes; and
   switching to the one of the operating modes in the data terminal equipment.

5. The method of claim 4 wherein the providing the notification step includes the steps of:
   providing a signal representative of data-set-ready to the data terminal equipment, where the data-set-ready signal is in the ON state, which is representative that said data connection has been established; and
   providing a clear-to-send signal to the data terminal equipment as a function of the operating modes.

6. The method of claim 5 wherein the step of providing the clear-to-send signal a) manipulates the clear-to-send signal to follow a signal representative of request to send that is provided by the data terminal equipment to the data communications equipment when said operating mode is half-duplex, and b) maintains the clear-to-send signal in the ON state irrespective of the request to send signal when said operating mode is full-duplex.

7. Apparatus for use in data communications equipment comprising:
   means for operating in a half-duplex mode and a full-duplex mode;
   means for receiving a signal from the remote data communications equipment, said signal indicative of one of the operating modes; and
   means responsive to the received signal for a) switching to the one of the operating modes and b) providing a notification signal representative of the one of the operating modes to a data terminal equipment.

8. The apparatus of claim 7 wherein the notification signal includes a data-set-ready signal, where the data-set-ready signal is in the ON state, which is representative that a data connection has been established to the remote data communications equipment, and a clear-to-send signal, whose operating state is a function of the one of the operating modes.

9. The apparatus of claim 8 wherein the means responsive to the received signal a) manipulates the clear-to-send signal to follow a signal representative of request to send that is provided by the data terminal equipment to the data communications equipment when said one of the operating modes is half-duplex, and b) maintains the clear-to-send signal in the ON state irrespective of the request to send signal when said one of the operating modes is full-duplex.

10. Modem apparatus for use in a data connection, the modem apparatus comprising:
   a first port for terminating one end of the data connection;
   a second port that is coupled to a data terminal by a data interchange circuit, which comprises a number of signals;

memory means to store information that is representative of a half-duplex mode of operation and a full-duplex mode of operation;

means for selecting one of the operating modes for communicating on the data connection, where the selection is a function of the other endpoint of the data connection; and means for manipulating at least one of the number of signals of the data interchange circuit in such a way that the at least one of the number of signals is representative of the selected operating mode, whereby the data terminal equipment receives notification of the selected one of the number of operating modes.

11. The apparatus of claim 10 wherein the means for manipulating a) manipulates a clear-to-send signal to follow a signal representative of request to send that is provided by the data terminal equipment to the data communications equipment when said selected mode is half-duplex, and b) maintains the clear-to-send signal in the ON state irrespective of the request to send signal when said selected mode is full-duplex.

* * * * *